UNITED STATES PATENT OFFICE 2,665,975

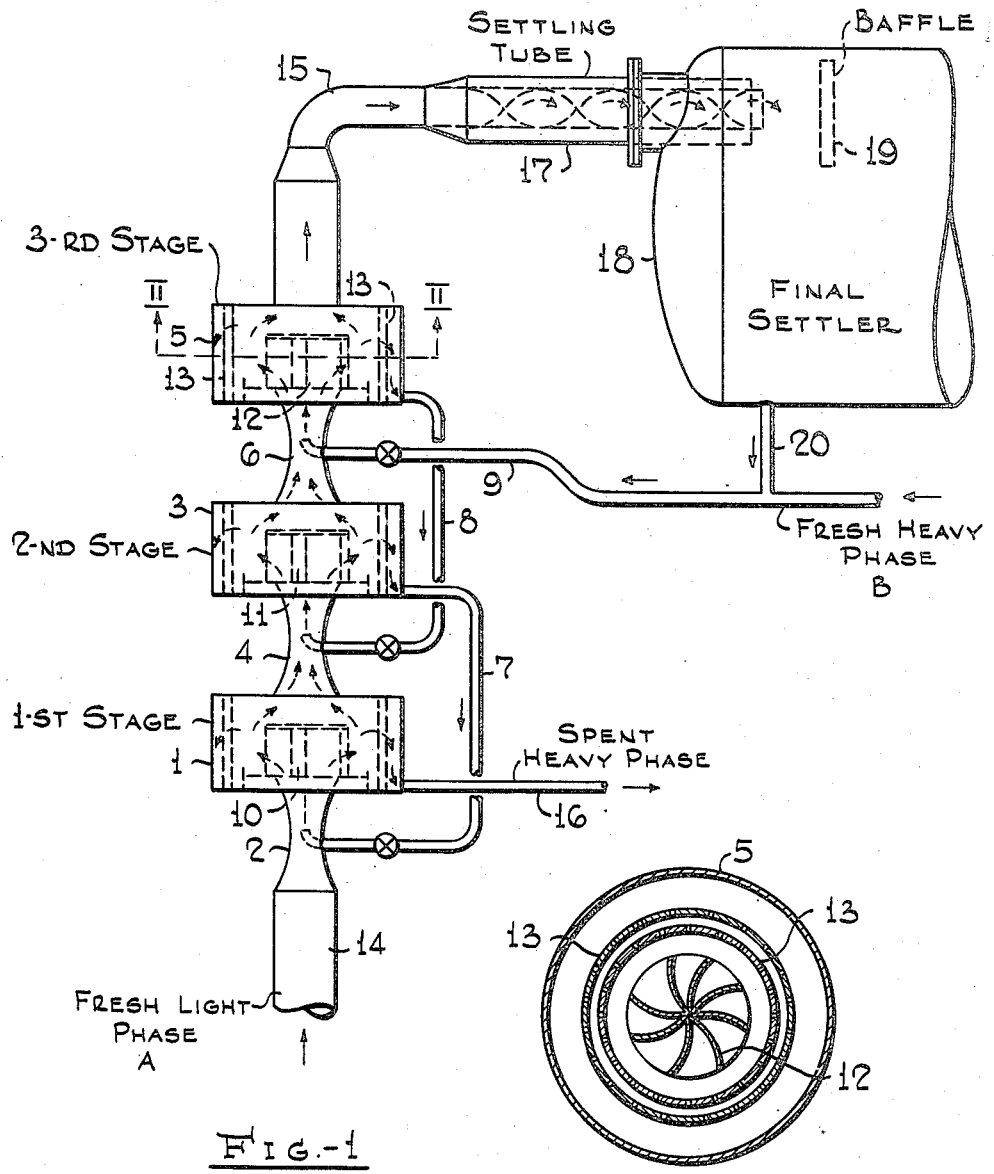

APPARATUS FOR COUNTERCURRENT CONTACT OF FLUID MATERIALS

Thomas Ng, Union, N. J., assignor to Standard Oil Development Company, a corporation of Delaware Application February 10, 1951, Serial No. 210,310

1 Claim. (Cl. 23—270.5)

This invention relates to apparatus for intimately and preferably countercurrently contacting materials comprising two phases capable of being pumped, and has for its object the provision of an improved apparatus of this character. More particularly, the invention comprises a novel combination wherein multistage countercurrent contact is induced solely through the inspirating action of successive Venturi throats and accelerated settling in the various stages is accomplished through centrifugal force induced by means of spiral vanes.

Numerous other aims, objects and advantages will be readily apparent to those skilled in the art in light of this specification taken in conjunction with the accompanying drawings wherein Figure 1 is a diagrammatic vertical central section of one form of the invention and Figure 2 is taken along lines II—II of Figure 1.

In its broadest aspect this invention comprises arranging in series a plurality of settling zones containing spiral vanes or other suitably positioned elements to produce centrifugally induced accelerated settling and into which the effluent associated venturis is discharged. The two immiscible fluids which are to be intimately contacted with one another are supplied to the system, one being supplied at a higher pressure and being used as the operating fluid for the venturis to be pumped thereby into intimate admixture into the settling zone with which each venturi is associated. After settling the liquid, which was used to operate the venturi associated with each zone, is withdrawn from the zone while being maintained at substantially the pressure resulting from the discharge of the venturi into the zone and is passed at that pressure as the operating fluid through the next venturi associated with the succeeding zone.

It is a fundamental aspect of this invention that the settling chamber, into which the effluent from the associated venturi is discharged, be equipped with spiral vanes or other devices adopted to induce centrifugal separation. Since an increase in the thruput of the operating fluid results in an increase in the flow of the fluid being pumped because of the increase in pressure across the Venturi throats, there is an increase in flow rate through the spiral vanes which results in an increase in the centrifugal action and a corresponding increase in the settling action. This compensates for the drop in settling efficiency which would otherwise develop as a result of (1) a reduction in retention time and (2) an increase in the mixing intensity due to higher pressure drops in the Venturi throats. In this manner the mixing and settling sections remain in balance over a wide range of capacity.

This invention is applicable to the contacting of two immiscible or not completely miscible liquids, as in solvent extraction processes such as solvent extraction of a lubricating oil or of a rosin or resin solution with a solvent which is selective for either the objectionable or the desired components thereof. The invention may be applied in the so-called "copper sweetening" of gasoline wherein sour gasoline is contacted with an aqueous copper solution to sweeten it. The invention is also applicable to contacting a gas with a liquid. For example it finds particular application in the contacting of a gas containing a valuable component with a selective absorption liquid therefor, such as in extracting a gaseous hydrocarbon stream containing butadiene with furfural.

One of the fluids being contacted is always a liquid since no cases of immiscible or incompletely miscible gases exist. The other fluid may be either a gas or a liquid. Either liquid may be clear or may be in the form of a slurry or emulsion of another material suspended or emulsified in a liquid. Thus this invention is applicable to other combinations than liquid-liquid such as liquid-gas, liquid-liquid slurry, liquid slurry-gas, etc.

It will be seen that this invention involves a system consisting of a combination of a series of venturis or eductors and centrifugal settling tanks, zones, or chamber for intimately contacting two immiscible or only partially miscible fluid phases wherein one fluid phase is introduced to the system at a higher pressure than the other and serves to force the lower pressure fluid through the system, without the use of any intermediate pumps whatsoever, by imparting a portion of its pressure energy to the lower pressure fluid.

Furthermore, each settling zone is equipped with means for centrifugally separating the fluids and since the centrifugal action increases with increase in the flow rate, the construction of the settling zone is such that it automatically increases the effective settling rate to counteract any loss in capacity as a result of reduction in settling time with greater thruput. Consequently, a greater capacity range is possible. Finally since centrifugal settling makes use of force many times that of gravity the settling zones can be made much smaller than would otherwise be possible.

The apparatus of the drawing may be used either in the position shown or in an inverted position with respect to that shown depending upon which fluid is in excess by volume.

With the chamber in the position shown, the lighter fluid A is introduced at the bottom of the chamber under pressure through the bottom Venturi eductor while the heavier fluid B is introduced at the top of the chamber at a pressure slightly lower than the pressure of the lighter fluid passing through the top Venturi eductor in the chamber. In other words, the lighter fluid serves to pump the heavier fluid. In general, with this arrangement it is preferable that the lighter fluid be in excess of the heavier fluid.

With the chamber in the inverted position, the heavier fluid is introduced under pressure into the top of the chamber through the Venturi eductor that has assumed the top position by reason of inversion of the chamber. (This is the same Venturi eductor through which the lighter fluid is introduced when the chamber is in the position shown.) The lighter fluid is then introduced into the bottom of the chamber at a pressure slightly lower than that of the heavier fluid passing through the Venturi eductor that has assumed the bottom position by reason of the inversion of the chamber. In other words, with the chamber in this position the heavier fluid serves to pump the lighter fluid. In general, with this arrangement it is preferred that the heavier fluid be in excess of the lighter fluid.

The operation of the arrangement shown will now be described. The designations A and B will be used for the light and heavy fluids respectively. The apparatus is divided in settling zones 1, 3 and 5 with their associated venturis 2, 4 and 6, the suction portions of which being fed from conduits 7, 8 and 9. Each settling chamber is provided with a plurality of spiral vanes 10, 11 and 12 placed across the discharge opening from the venturi and parallel to the fluid flow. Each setting chamber is also provided with perforated baffles 13 to aid in settling the heavy phase.

Fluid A enters the system at the bottom through pipe 14, venturi 2 and spiral vanes 10 into settling zone 1. Fluid B is pumped by venturi 2 from settling zone 3 into settling zone 1. Due to the centrifugal action of the spiral vanes 10, the fluids tend to separate in this zone, the heavier fluid B settling to the bottom in the region of the baffles 13 and the lighter fluid A rising to the top. Fluid A passes from settling zone 1 through venturi 4 and into settling zone 3. In passing through venturi 4 fluid A pumps fluid B from settling zone 5 through spiral vanes 11 into settling zone 3. Again the centrifugal action results into the separation of the liquid into the two phases. The process is repeated for as many settling zones and venturis as may be desired. In the drawing fluid A is withdrawn from the top settling chamber 5 through pipe 15 and fluid B is withdrawn from the settling zone 1 through pipe 16. Final separation of any residual fluid B from fluid A is accomplished by passing fluid A from line 15 through settling tube 17 into enlarged settling zone 18. Settling zone 18 is preferably provided with baffle 19 opposite the discharge point of settling tube 19 to aid in separating any residual fluid B which is then introduced into input line 9 through line 20. Fluid B is pumped into the system through line 9 by means of venturi 6. The contacting is accomplished through the turbulence set up in the venturis in pumping one fluid with another. The settling is accomplished by the centrifugal action set up by the spiral vanes located at the point of discharge from each venturi.

For any given system there will be a set of pressure, temperature, and other conditions for the two fluids which will give maximum efficiency. At that efficiency the ratio of the pumping fluid to the fluid being pumped will be some definite value. At the expense of lowered efficiency, it is possible to alter this ratio to any other ratio wherein the volume of one fluid required to pump a given volume of another is greater than that at maximum efficiency. In other words, the efficiency of the system determines the requirements in regard to the volume ratio at which the pumping fluid and the fluid being pumped must be supplied. For example, if the maximum efficiency of a system were 50 per cent, two volumes of pumping fluid would be required per volume of fluid being pumped— a ratio of 2 to 1; but if the volume of pumping fluid and the fluid with which it is to be contacted were available in the ratio of 3 to 1, the efficiency of the system would have to be decreased to 33⅓ per cent by some suitable means or another.

Altering the efficiency of a system to values below its maximum efficiency can be accomplished by several different means or combinations of them. For example, valves installed in the feed lines to a system of eductors and their accompanying settling zones, or chambers and in the fluid carrying zone between individual units in the system may be used to control the volume of flow of one fluid with respect to another and thus decrease the efficiency of the system; or the efficiency may be varied below the maximum by providing suitable means for adjusting the pressure differential, at the points of introduction into the system, between the two fluids to be contacted, etc.

The nature of the present invention having been thus fully set forth and specific examples of the same given, what is claimed as new and useful and desired to be secured by Letters Patent is:

An apparatus for counter-current contacting of substantially immiscible liquids of different specific gravities comprising a series of separate closed contacting chambers disposed in vertically superimposed coaxial relationship, each of said chambers having an inlet and a discharge end, a series of vertically disposed venturis discharging into the inlet end of each of said chambers, each of said venturis having an inlet opening at the throat thereof and an up-stream inlet, said up-stream inlets, except the first, connecting with the discharge outlet from the next preceding chamber, spiral vanes radiating from a common center in each chamber, said vanes being disposed in coaxial relationship with the discharge end of each venturi, an annular perforated baffle surrounding said vanes, forming a settling space, conduits connecting the settling space of each chamber, except the first, with the throat inlet in the venturi discharging into the immediately preceding chamber, a conduit connected to the throat inlet of the last of said venturis in series for introducing a fresh stream of one of said liquids, a conduit connected coaxially with the up-stream inlet of the first of said venturis for introducing the other of said liquids, a conduit for withdrawing final product from the last of said chambers and a conduit connected with the settling space of the first of said chambers for withdrawing final product therefrom.

THOMAS NG.

References Cited in the file of this patent

UNITED STATES PATENTS

| Number | Name | Date |
|---|---|---|
| 2,020,850 | Myhren et al. | Nov. 12, 1935 |
| 2,063,789 | Burk | Dec. 8, 1936 |
| 2,192,094 | Moore | Feb. 27, 1940 |
| 2,345,667 | Hachmuth | Apr. 4, 1944 |
| 2,560,072 | Bloomer | July 10, 1951 |

FOREIGN PATENTS

| Number | Country | Date |
|---|---|---|
| 585,517 | Germany | Oct. 10, 1933 |